United States Patent
Chou

(10) Patent No.: US 8,859,896 B2
(45) Date of Patent: Oct. 14, 2014

(54) PROTECTIVE SHELL HOLDING A PORTABLE ELECTRONIC DEVICE TO PROVIDE OPTIMIZED SOUND EFFECTS

(71) Applicant: King I Tech Corporation, Taichung (TW)

(72) Inventor: Ming-Fu Chou, Taichung (TW)

(73) Assignee: King I Tech Corporation, Taichung (TW)

( * ) Notice: Subject to any disclaimer, the term of this patent is extended or adjusted under 35 U.S.C. 154(b) by 171 days.

(21) Appl. No.: 13/692,554

(22) Filed: Dec. 3, 2012

(65) Prior Publication Data

US 2014/0078650 A1    Mar. 20, 2014

(30) Foreign Application Priority Data

Sep. 14, 2012 (TW) .............................. 101217796 U

(51) Int. Cl.
 *H05K 5/00* (2006.01)
 *G06F 1/16* (2006.01)
 *H05K 5/02* (2006.01)

(52) U.S. Cl.
 CPC ................ *H05K 5/02* (2013.01); *G06F 1/1626* (2013.01); *G06F 2200/1633* (2013.01)
 USPC ...... 174/50; 174/520; 361/379.01; 312/223.1

(58) Field of Classification Search
 CPC ............................... H05K 5/02; G06F 1/1626
 USPC ............. 174/549, 50, 520, 559, 560; 206/37; 361/679.01, 679.56; 312/223.1
 See application file for complete search history.

(56) References Cited

U.S. PATENT DOCUMENTS 7,947,900 B2 * 5/2011 Cheng et al. .................... 174/50
8,609,985 B2 * 12/2013 Chen et al. ...................... 174/50

\* cited by examiner

*Primary Examiner* — Dhirubhai R Patel
(74) *Attorney, Agent, or Firm* — Muncy, Geissler, Olds & Lowe, P.C.

(57) ABSTRACT

A protective shell holding a portable electronic device to provide optimized sound effects includes a sound release portion. The protective shell includes a body and a sound effect output portion located on at least one edge of the body. The sound effect output portion includes a curved wall surface and at least one rib located on the curved wall surface. The portable electronic device leans on the at least one rib to form at least one gap with the curved wall surface. Hence the sound release portion can release sound through the gap. The curved wall surface also can provide sound resonance to adjust output quality of the sound, thereby is achieved optimized sound effects.

5 Claims, 4 Drawing Sheets

PROTECTIVE SHELL HOLDING A PORTABLE ELECTRONIC DEVICE TO PROVIDE OPTIMIZED SOUND EFFECTS

FIELD OF THE INVENTION

The present invention relates to a protective shell and particularly to a protective shell holding a portable electronic device to provide optimized sound effect.

BACKGROUND OF THE INVENTION

People nowadays substantially rely on technology. Advance of the technology has enriched the functions of portable electronic products. Their profiles also are designed with enhanced appeal. Some portable electronic products are quite expensive. Hence many users use a protective film or protective cover to protect the surface of the portable electronic products from abrasion. Some people also use a protective casing to hold the portable electronic device to prevent its appearance from wearing and also avoid impact from external forces via the hard shell or thicker soft shell to prohibit accidental damage.

Some portable electronic products, such as iPad, iPhone or other smart phones have multiple buttons on the circumference thereof. The protective casing usually is formed at a greater thickness. In the event that the designed dimension does not fit exactly, the buttons often are blocked by the protective casing that makes pressing difficult. More important, the portable electronic products usually have a speaker located on the circumference. To avoid the sound output from the speaker from being blocked by the protective casing, the protective casing must have an opening mating the speaker to prevent blocking of the sound. The opening can only avoid sound from blocking, but cannot enhance or improve the sound quality.

SUMMARY OF THE INVENTION

The primary object of the present invention is to provide a protective shell capable of optimizing sound quality to enhance total quality of the portable electronic device.

To achieve the foregoing object, the invention provides a protective shell holding a portable electronic device to provide optimized sound effects. The protective shell holds a portable electronic device. The portable electronic device includes a sound release portion. The protective shell includes a body and a sound effect output portion located on at least one edge of the body. The body is formed in a shape corresponding to that of the portable electronic device for holding thereof. The sound effect output portion includes a curved wall surface and at least one rib located on the curved wall surface. The portable electronic device leans on the rib to form at least one gap with the curved wall surface. Hence the sound release portion can release sound through the gap.

Thus, the invention, by providing the rib the portable electronic device can release sound from the sound release portion through the gap. Moreover, through the curved wall surface, the output quality of the sound improves, thus the portable electronic device can achieve optimized sound effects.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
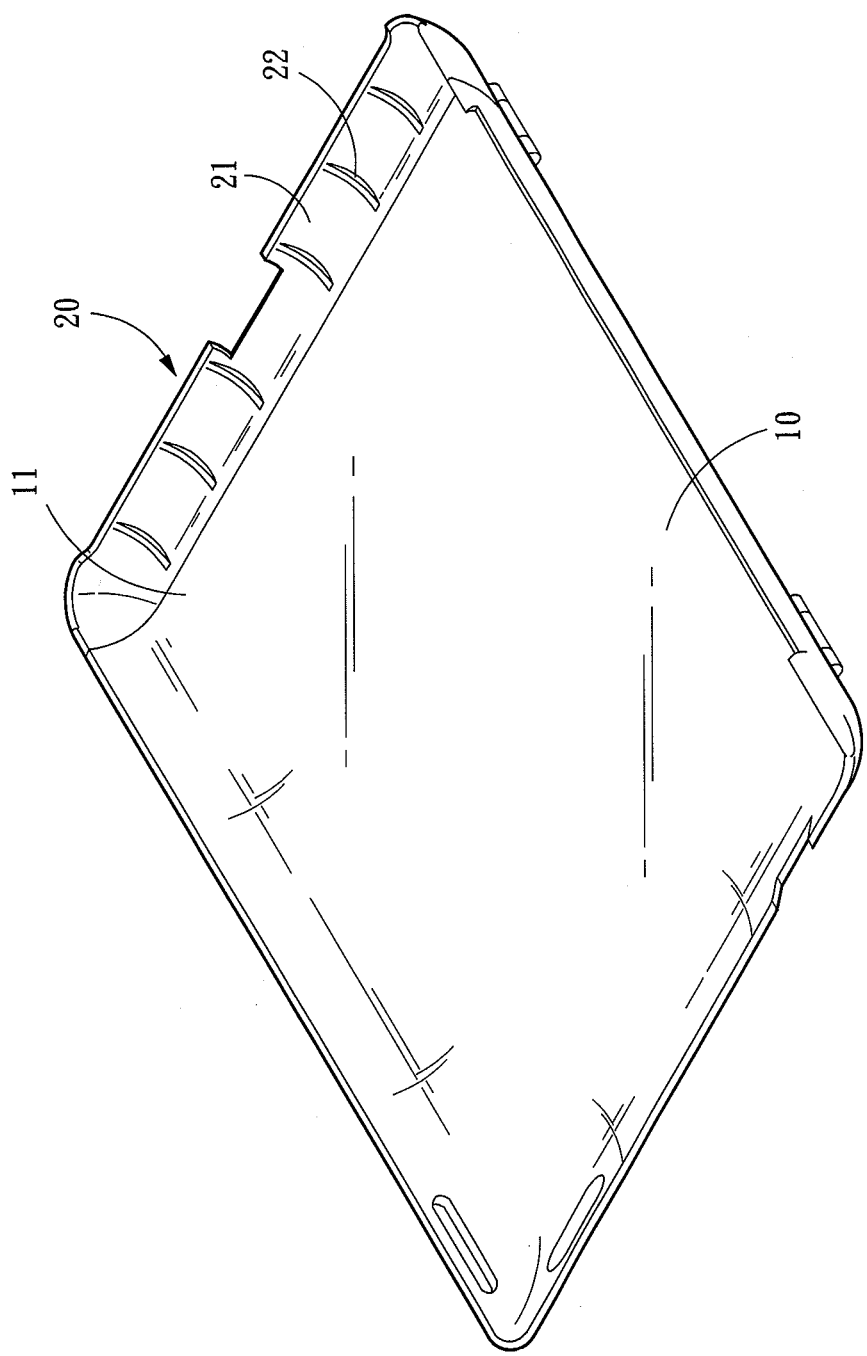
FIG. 1 is a perspective view of an embodiment of the invention.
Figure 2A:
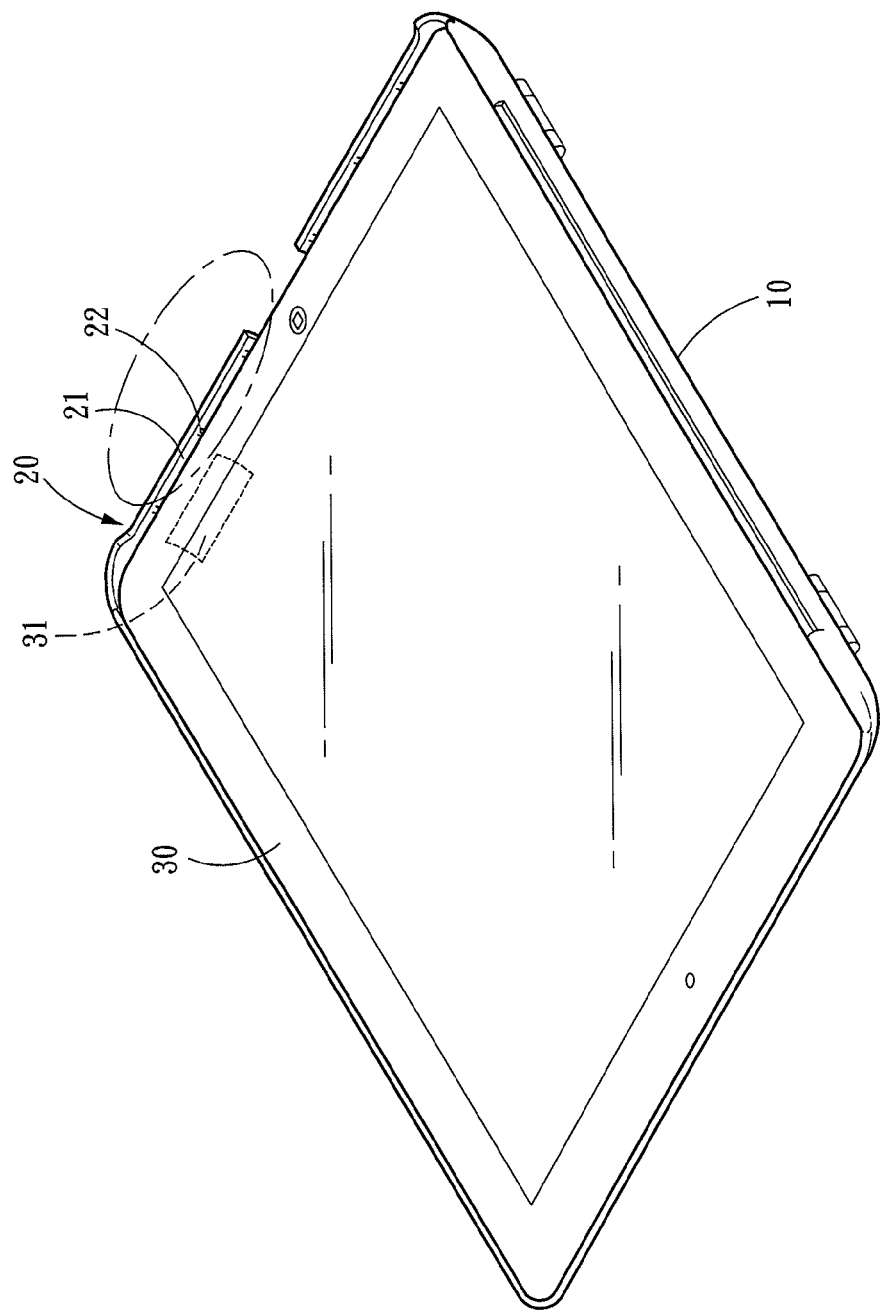
FIG. 2A is a perspective view of an embodiment of the invention in an assembly condition.

Please refer to FIGS. 1 and 2A for an embodiment of the protective shell according to the invention. It holds a portable electronic device 30. The portable electronic device 30 includes a sound release portion 31. In this embodiment the portable electronic device 30 is an iPad as an example for discussion. The protective shell includes a body 10 and a sound effect output portion 20 located on at least one edge 11 of the body 10. The body 10 is formed in a shape corresponding to that of the portable electronic device 30 for holding thereof. Given the iPad as the example, the body 10 has four edges 11. The sound effect output portion 20 is located on one of the edges 11 and at one side of the portable electronic device 30 where the sound release portion 31 is located.

Figure 2B:
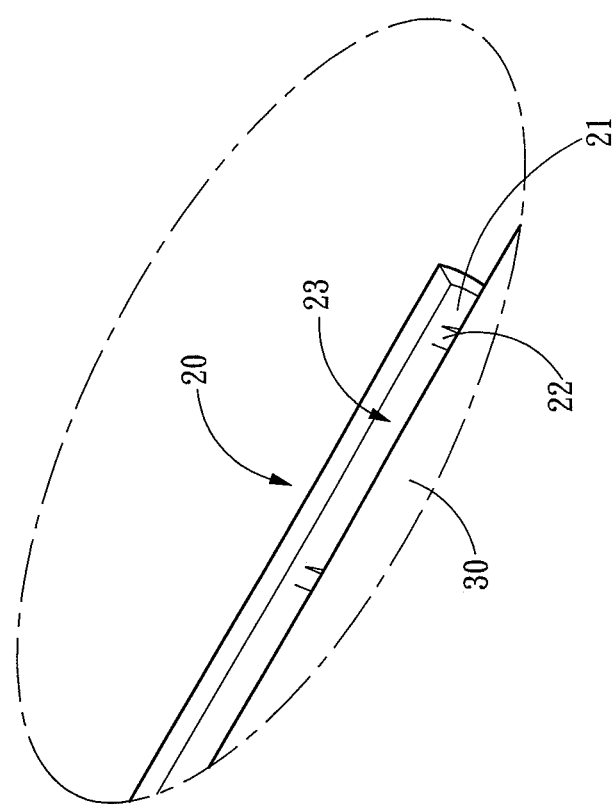
FIG. 2B is a fragmentary enlarged view according to FIG. 2A.
Figure 3:
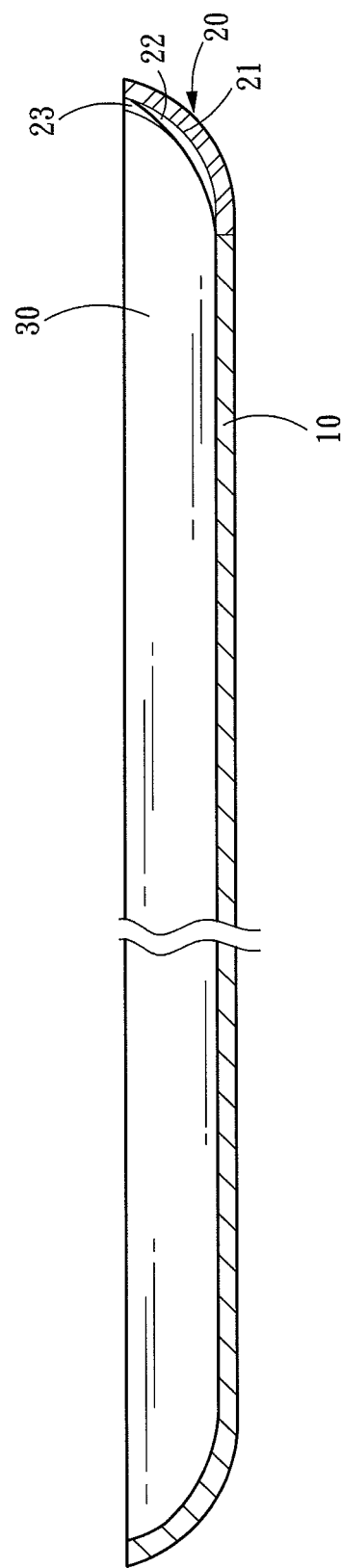
FIG. 3 is a sectional view of an embodiment of the invention.

The sound effect output portion 20 includes a curved wall surface 21 and at least one rib 22 located on the curved wall surface 21. The curved wall surface 21 can be formed at a desired angle according to requirements, such as an arched shape. Also referring to FIGS. 2B and 3, that are fragmentary enlarged view and sectional view of FIG. 2A. The portable electronic device 30 leans on the rib 22 and forms at least one gap 23 with the curved wall surface 21. Hence sound from the sound release portion 31 can be released through the gap 23. In this embodiment of the iPad, three ribs 22 are provided corresponding to the sound release portion 31. In response to symmetrical positioning three more ribs 22 can be provided on the other end opposite to the sound release portion 31. The control factors of the ribs 22, such as locations, their spaced distances and thicknesses can be adjusted according to actual condition of the portable electronic device 30 and output quality of the sound from the sound release portion 31.

Moreover, the sound effect output portion 20 and body 10 can be integrally formed to achieve benefits of lower cost and stable structure. The position of the sound effect output portion 20 can match the position of the sound release portion 31, and also can be formed in multiple sets to mate the portable electronic device 30.

In short, the invention provides the rib to form a gap for releasing sound from the sound release portion of the portable electronic device. Moreover, through the curved wall surface, output quality of the sound improves, hence the portable electronic device can achieve optimized sound effects. In addition, through controlling the thickness, number and spaced distance of the ribs, sound release quality from the sound release portion also can be adjusted. Thus the invention provides significant improvements over the conventional techniques.

While the preferred embodiment of the invention has been set forth for the purpose of disclosure, it is not the limitation of the invention, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A protective shell holding a portable electronic device to provide optimized sound effects, the portable electronic device including a sound release portion, the protective shell comprising:
    a body formed in a shape corresponding to that of the portable electronic device for holding thereof; and
    a sound effect output portion which is located on at least one edge of the body and includes a curved wall surface and at least one rib located on the curved wall surface, the portable electronic device leaning on the at least one rib to form at least one gap with the curved wall surface, the sound release portion releasing sound effects through the at least one gap.

2. The protective shell of claim 1, wherein the body includes four edges, the sound effect output portion being located on one of the four edges.

3. The protective shell of claim 2, wherein the sound effect output portion is positioned at one side of the portable electronic device where the sound release portion is located.

4. The protective shell of claim 1, wherein the sound effect output portion includes three ribs which are spaced equally from each other.

5. The protective shell of claim 1, wherein the curved wall surface is formed in an arched shape.

* * * * *